United States Patent [19]

Christensen et al.

[11] 4,424,256

[45] Jan. 3, 1984

[54] RETORTABLE FOIL-BASED PACKAGING STRUCTURE

[75] Inventors: Ronald C. Christensen, Oshkosh; Roger P. Genske; Dennis E. Kester, both of Neenah; William F. Ossian, Appleton, all of Wis.

[73] Assignee: American Can Company, Greenwich, Conn.

[21] Appl. No.: 405,752

[22] Filed: Aug. 6, 1982

[51] Int. Cl.³ .......................... C09J 7/02; B32B 15/08
[52] U.S. Cl. ................................ 428/347; 156/244.11; 428/35; 428/349; 428/458; 428/461; 428/515; 428/516; 428/913
[58] Field of Search ................. 428/35, 461, 347, 349, 428/457, 515, 516, 913, 458; 156/244.11

[56] References Cited

U.S. PATENT DOCUMENTS 4,190,477  2/1980  Ossian et al. .................. 156/244.11
4,363,841  12/1982  Snow ..................................... 428/35

Primary Examiner—Thomas J. Herbert, Jr.
Attorney, Agent, or Firm—Stuart S. Bowie; Thomas D. Wilhelm

[57] ABSTRACT

The invention provides improved films and pouches made therefrom for use in sterile packaging, wherein the package and product are sterilized after the process of filling and sealing the pouch. The improved films are a family of foil-based, multiple layer structures incorporating an improved combination of layers which form the sealant layer and the adhesive bonding to the foil layer. The sealant layer is linear low density polyethylene. The layer adjacent the sealant layer is a blend of 20% to 80% propylene ethylene copolymer and 80% to 20% linear low density polyethylene. The foil layer is primed with an anhydride modified propylene-based primer. Additional layers comprising propylene based polymers may be used between the blend layer and the primer.

14 Claims, 7 Drawing Figures

RETORTABLE FOIL-BASED PACKAGING STRUCTURE

BACKGROUND OF THE INVENTION

Heat sealed pouches made from flexible sheet stock are now being used for packaging certain products which are stored under sterile conditions. Typical products packaged and used in this manner are certain foods and medical supplies. The packaging thus used is known generally as a retort pouch.

The first generation of retort pouches included certain adhesives, used for laminating the various layers. The adhesives had some residual monomer moieties after the adhesive was fully cured. These structures were rejected by governmental authorities because of the perceived possibility of migration of toxic monomers into the packaged food product.

In more recent developments, retort pouch structures are made by various methods of adhering the layers to each other by one or more of several extrusion processes. Illustrative of these processes is one taught in U.S. Pat. No. 4,190,477. In the process described in that patent, a metal foil based sheet structure is constructed. A biaxially oriented polyester is first adhesively mounted to the foil on what is to be the outside of the package. This use of adhesive is considered acceptable because the foil serves as an effective barrier to migration of residual monomer to the inside of the package. A polypropylene-based heat sealing layer is separately extruded and cooled. A primer is applied to the side of the foil opposite the polyester. Finally the sealant layer is drawn into a nip with the primed foil and a hot layer of extrusion grade polypropylene-based polymer is drawn into the nip between the sealant layer and the primer layer in an extrusion laminating process.

Common to the requirements of retort pouch packaging is the requirement that the filled and sealed package be subjected to sterilizing conditions of relatively high temperature after the bag is filled with product and sealed. Typical sterilizing conditions range in severity up to about 275° F. with residence times at that temperature of as much as 30 minutes or more. Such conditions impose severe stresses on the packages. Many packaging structures provide excellent protection for the package contents at less severe conditions. For example, relatively simple packaging structures for packaging requiring the ability to withstand boiling water, such as at 212° F. are readily available from several suppliers. When sterilizing conditions are required, however, most of these packages fail to survive the processing. Typically, problems are encountered with excessive weakening or failure of the heat seals about the periphery of the pouch. Also certain weaknesses or separations may develop between the layers in the multiple layer sheet structure.

Among those structures which have proven themselves capable of withstanding the sterilizing process, the sealant, or inner layer of the pouch is believed to be, in almost all cases, based on polypropylene, and in some cases, propylene copolymers. While pouches made with the propylene based polymers are functionally capable of surviving the sterilizing process, their sheet structure is relatively brittle and hard. Thus the pouches are somewhat susceptible to flex cracking and seal impact fracture if subjected to rough handling. There are also some limited problems with weakening of interlayer adhesion between the primed foil and the sealant layer.

Once the interlayer adhesion is weakened, the pouch is, of course, subject to further damage by limited abusive handling which an unweakened pouch could normally tolerate.

While known pouch structures have achieved a limited degree of success, it is desirable to provide an improved sheet structure which is capable of surviving intact the typical sterilizing processes. It is particularly desirable to have a sheet structure with an improved sealant layer structure. Among the characteristics of the improved sealant layer structure are that it should be less brittle than the propylene-based sealants. It should also survive the sterilizing process with good heat seal strength about the pouch periphery. Also the interlayer adhesion should remain strong enough that the several layers remains intact as a unit and mutually support each other under stress, particularly after the sterilization process.

SUMMARY OF THE INVENTION

It has now been found that certain of the foregoing and related desirable improvements are attained in a new family of laminated structures wherein the layers are firmly adhered to each other in face to face contact. The structures have a first layer of linear low density polyethylene. A second layer of a blend of 20% to 80% linear low density polyethylene and 80% to 20% propylene ethylene copolymer is adhered on one of its surfaces to the first layer. A third layer of aluminum foil is adhered to the second layer through a primer coating on the third layer. Namely, the primer coating is juxtaposed between the second and third layers. The primer coating is an anhydride modified polypropylene composition. A preferred composition for the second layer is 40% to 60% linear low density polyethylene and 60% to 40% propylene ethylene copolymer. In some embodiments, it is desirable to have a fourth layer between the primer coating and the second layer, the fourth layer being a propylene ethylene copolymer. It is further desirable, in some cases to have an additional layer of propylene ethylene copolymer between the primer coating and the fourth layer. On the surface of the foil opposite the primer coating, there is desirably a tough and abuse resistant polymer such as polyethylene terephthalate.

In its simplest form, the structure may be made by the process of extrusion laminating the first layer to the primer coating by using the material of the second layer as the extrusion laminant. An alternate method of making the basic structure is by the process of extrusion coating the first and second layers onto the primer coating.

In making the more complicated structures of the family, any of a variety of processes may be selected. For example, the first and second layers may be coextruded as a separate structure and extrusion laminated to the primer coating using the composition of the fourth layer as the extrusion laminant. Another acceptable method is coextrusion laminating the first layer to the primer coating using as the coextrusion laminant a coextrusion of the compositions of the second and fourth layers.

Still another acceptable method is that wherein the first, second, and fourth layers are extrusion coated or coextrusion coated onto the primer coating.

DETAILED DESCRIPTION OF THE INVENTION

Figure 1:
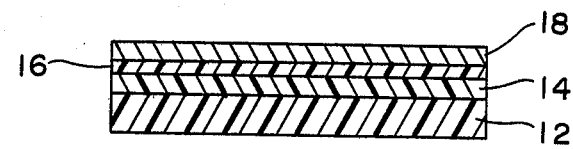
FIG. 1 is a cross-section of a basic sheet structure of this invention.
Figure 2:
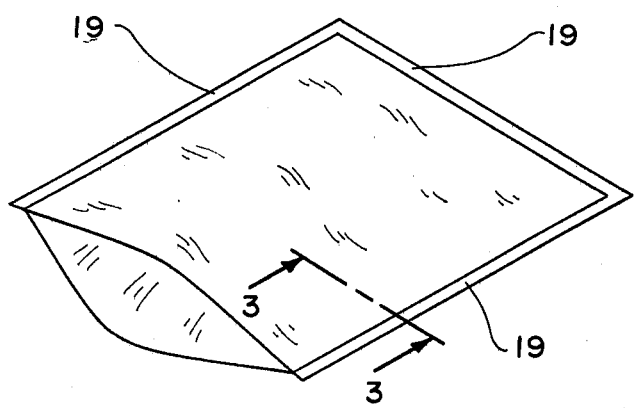
FIG. 2 illustrates a pouch made from sheet structure of the invention.

The invention will now be explained in detail and in relation to the drawings. FIG. 1 illustrates the invention in its simplest form, as a heat sealable flexible packaging film which can be formed into retortable pouches such as is shown in FIG. 2. Referring now to FIG. 1, layer 12 is a heat sealable layer comprised of linear low density polyethylene. Layer 14 is an adhesive, or tie, layer and is a blend of linear low density polyethylene and propylene ethylene copolymer. Layer 16 is an anhydride modified propylene-based primer; and layer 18 is aluminum foil.

Figure 3:
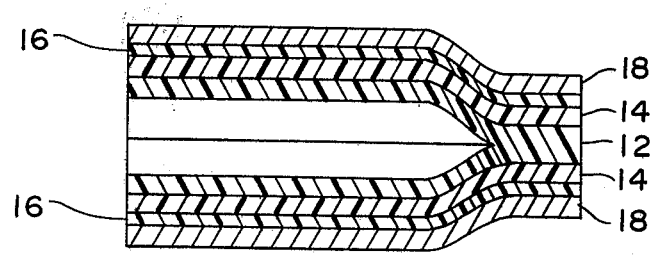
FIG. 3 is a cross-section of a portion of the pouch of FIG. 2 and is taken as shown at 3—3 of FIG. 2.

The sheet structure as in FIG. 1 is readily made into a pouch such as is shown in FIG. 2. The pouch is formed by arranging two sheet elements in face to face relationship and forming heat seals about the common periphery. Alternately, the pouch may be formed by folding a sheet element onto itself and forming heat seals about the edges. Either way, the formed pouch appears as shown in FIG. 2. The cross section of the pouch is shown in FIG. 3. Layer 18 forms the exterior surface of the pouch. Layer 12 forms the interior surface of the pouch and forms the heat seals. The pouch structure thus has an inner heat seal layer of linear low density polyethylene and an outer surface layer of aluminum foil. Intermediate layer 16, of primer, and adhesive layer 14 serve to bond the structure together.

The formed pouch is intended for packaging products which will be subjected to a sterilizing process after the product is in the package and the package is sealed. A common sterilizing process is known as autoclave, or retort, processing. In this process, closed and sealed packages are placed in a pressure vessel. Steam and water/or air is then introduced into the vessel at about 275° F. at a sufficiently high pressure to permit maintenance of desired temperature. The temperature and pressure are usually maintained for about 30 minutes. Finally, the pressure vessel and product are cooled at the same process pressure and the processed packages are removed.

In the pouch structure, the heat seal layer 12 significantly influences the physical properties of the pouch because there is physically more material in layer 12 than in any other layer. The composition of layer 12 may be any of the polymers of copolymers known as linear low density polyethylene. These polymers are relatively extensible and elastic in nature, giving the pouch a degree of resilience in absorbing physical abuse.

Layer 14 is a blend of 80% to 20% propylene ethylene copolymer and 20% to 80% linear low density polyethylene. A preferred blend is 60% to 40% propylene ethylene copolymer and 40% to 60% linear low density polyethylene. The blend of layer 14 serves as a tie layer to bond layer 12 to the remainder of the structure.

Layer 16 is an anhydride modified polypropylene primer which has been applied as a coating to the aluminum foil 18.

Figure 4:
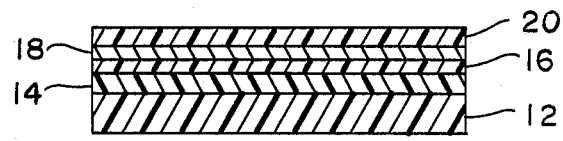
FIGS. 4, 5, 6 and 7 are alternate sheet structures of the invention.

Thus is the invention in its simplest form illustrated by FIGS. 1, 2 and 3. While this structure does have limited utility and is fully functional in that it will withstand the rigors of the sterilizing process, its physical strength, and its ability to absorb external abuses, is rather limited. For example, the external foil layer is easily scratched or torn, detracting from its barrier properties. Thus it is preferred in most cases that additional layers be incorporated into the sheet structure. Thus FIG. 4 shows an additional layer 20 of abuse resistant polymeric material on the surface of foil layer 18 which is opposite layer 12, and which is to be on the outside surface of the pouch. Layer 20 thus serves as a layer protective of the foil; to absorb the abuse of rough or sharp projections or edges which the pouch may contact. Materials which are suitable for this layer are oriented films of nylon, polyester and polypropylene. While others may work, these are the most common—and, additionally, lend significant strength to the ability of the pouch to resist extensive-type stresses. Since layer 20 is to be, in the pouch, exterior of the pouch foil barrier layer 18, it is satisfactory, and indeed desirable, that layer 20 be bonded to foil layer 18 with a conventional adhesive layer, not shown.

Another structure, shown in FIG. 5, is again a modification of the FIG. 1 structure. In the FIG. 5 structure an additional layer 22, of propylene ethylene copolymer, is included between blend layer 14 and primer coating 16. Copolymer layer 22 serves primarily an adhesive function where additional bonding strength is needed between layers 14 and 16. It will be appreciated that the composition of blend layer 14 may vary depending on the significance of each of its several functions. Some of the potential layer 14 compositions, particularly those having large proportions of linear low density polyethylene may have a weak bonding capability for layer 16. A weak bond may alternately result from the method of construction of the sheet structure. While the composition of layer 14 may be changed, in some cases this may not be desirable. The inclusion of layer 22 is materially beneficial. It provides freedom to compound layer 14 to meet needs other than bonding to layer 16, while assuring a good bond to layer 16.

The composition of layer 22 is a propylene ethylene copolymer, with about 2% to 8% ethylene and 92% to 98% propylene being a preferred range of compositions. Desirably, the copolymer for layer 22 and the composition of blend layer 14 are chosen so that both layers 14 and 22 have similar melt flow rheology. If these properties are thus carefully chosen, the processing of these polymers, such as by coextrusion is facilitated.

Figure 6:
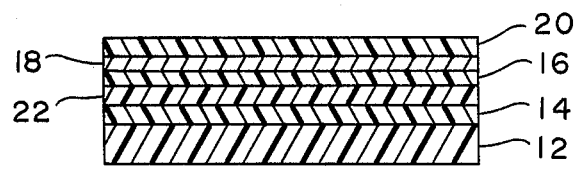

The cross-section shown in FIG. 6 shows still another structure, and is the most commonly preferred structure for use in this invention. Working from a basis of the simplest structure of FIG. 1, FIG. 6 incorporates layers 20 and 22 into a single structure, providing the benefits of both layers, and the combination of strengths which enhance the overall integrity of the structure. It will be understood that the improved interlayer bonding provided by layer 22 and the extensibility resistance provided by layer 20 cooperate in absorbing physical stresses on the sheet structure and indeed on the pouch, and in minimizing their potentially detrimental affects on the integrity of the pouch, and on the ability of the pouch to contain and protect the product.

Figure 7:
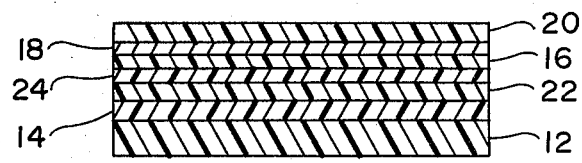

FIG. 7 shows still another cross-section which is the same as the FIG. 6 cross-section with the addition of an additional layer 24 between layers 22 and 16. This layer 24 is either a polypropylene or a propylene ethylene copolymer. The exact composition of layer 24 is selected for good bonding strength between layers 16 and 22 and may also be selected according to its melt flow properties where it is convenient to use layer 24 as a laminating layer. As will be seen hereinafter in the description of processes for making the sheet structures of this invention, it may be desirable, in certain cases to construct separate layer sub-structures and combine those sub-structures by either extrusion laminating or by hot and pressurized nip bonding. Layer 24 is particularly well adapted for use in these processes as a bonding layer.

Further to the structure of FIG. 7, layer 22 may also be a blend of propylene ethylene copolymer and linear low density polyethylene. In that capacity, layer 14 may desirably have a high proportion of linear low density polyethylene and layer 22 may desirably have a high proportion of propylene ethylene copolymer, with 40% to 80% copolymer being preferred.

Considering in more detail now the function of layer 14, it is noted that the primer coating 16 on foil layer 18 is predominantly polypropylene. While the primer has good adhesion to the foil, its polypropylene-based chemical nature limits the choices of materials which will be successfully bonded to it. Conventional wisdom teaches that additional layers of polypropylene be used to provide layers for sealing and, as necessary, bonding. In the structures of this invention, however, the sealing layer 12 is composed of linear low density polyethylene, which does not form good bonds to propylene-based polymers. Thus is layer 14 crucial in providing a bonding bridge to bring together the benefits of the propylene bond to the foil layer and the linear low density polyethylene sealant layer.

Blend layer 14 is intentionally defined with a broad range of compositions such that the composition for each structure may be tailored for best performance in that particular structure. The first important parameter to be considered is that the two components of the blend must form a compatible polymeric mixture, which they do. Secondly each of the components of the blend contributes to forming good bonding with the adjacent layer of like polymeric composition. Thus the propylene ethylene copolymer component of the blend contributes the preponderance of the bond forming capability between layer 14 and the adjacent propylene-based layer. Similarly the linear low density polyethylene component of the blend contributes the preponderance of the bond forming capability between layer 14 and layer 12 which is composed of linear low density polyethylene.

In general terms, the preferred composition for layer 14 is 40% to 60% propylene ethylene copolymer and 60% to 40% linear low density polyethylene. Indeed, a composition highly satisfactory for a variety of structures of this invention is 50% propylene ethylene copolymer and 50% linear low density polyethylene. Depending which polymers or copolymers are independently chosen for layers 12, 14, and the adjacent propylene based layer, i.e. 22 or 16, the blend composition may be adjusted for maximum benefit either by adjusting the blend ratio, by selecting an alternate polymer component of propylene ethylene copolymer or of linear low density polyethylene, or by using both techniques. For example, using the general structure of FIG. 1, if the bond between layers 14 and 16 is weaker than desired, the composition of layer 14 may be adjusted. One alternative is to increase the proportion of propylene ethylene copolymer in the layer 14 composition. Another alternative is to choose an alternate specific polymer for use as the propylene ethylene component of the blend.

The above techniques regarding adjusting the layer 14 composition are significant in enabling the best practice of the invention and in obtaining maximum benefit from the packages of the invention. These techniques are, however, only significant regarding maximizing the benefits to be gained from the invention, and are not all critical to the basic practice of the invention, which can be satisfactorily practiced within a broad range of compositions of layer 14.

The term propylene ethylene copolymer should herein be interpreted, and is intended to include, copolymers of propylene and ethylene, blends of polypropylene and polyethylene, and combinations of copolymers and blends.

The layers in the structure containing significant amounts of polypropylene, namely layers 14, 22 and 24, also contain some ethylene, with the ethylene content in layer 24 being optional. The function of the ethylene is to provide increased resilience to the layers between the primer and the sealant layer, and to lend a degree of tolerance to bending of the pouch. Polypropylene homopolymer layers are susceptible to developing lines of stress weakening when subjected to abuse testing or abusive handling. The ethylene component reduces this susceptibility. A lower limit of about 2% ethylene is preferred to provide minimal improvements in the layers. A composition of 3.5% ethylene is highly desirable. As the amount of ethylene is increased, the susceptibility to stress weakening is reduced. However, the ethylene content may not be indiscriminantly increased, as other, and undesirable, parameters may emerge. Particularly, polymeric ethylene does not tolerate retort conditions as well as polypropylene, so some polypropylene is required for processability. Also a high fraction of polypropylene is necessary for good bonding, such as to layer 16. For most uses, the ethylene content will be relatively low. The specific content for each layer and each structure depends upon the end use anticipated for the final structure.

Another primary element of concern is that the compositions of layers 14, 22, and 24 be selected such that there is good compatibility physically and chemically between the compositions of layers which are joining at a common interface; this to encourage intimate contact and bond development between the respective components of the layers.

The sheet structures of this invention may be made by a variety of processes and combinations of processes. The process and its sequences may be selected according to the equipment and polymers available. The specific structure selected and the layer 14 composition will be at least partially dependent on the process sequence.

Using FIG. 1 as an example structure, foil layer 18 is first solution coated with primer 16 and the primer dried and cured. In a single step process for completing the structure, layers 12 and 14 are coextrusion coated onto layer 16. Use of this process imposes certain limitations on the composition of layer 14. While it must bond to layer 16 in the finished structure, a primary concern imposed by the process is that the compositions of layer 12 and, particularly, 14 must be coselected so that the processing temperatures and melt flow properties are compatible to coextrusion and coextrusion coating. Particularly regarding layer 14, certain compromises, such as bond strength between layers 14 and 16, may have to be made in its composition, albeit within the ranges of the invention, in order to accomodate the coextrusion and coextrusion coating processes.

In another process for making the FIG. 1 structure, layer 12 is extruded as a separate film. Layer 12 and the combination of layers 16 and 18 are then pulled through a nip from opposite sides and layer 14 is extruded into the nip between layers 12 and 16 in an extrusion laminating process.

In still another process for making the structure of FIG. 1, layers 12 and 14 are coextruded and the combinations of layers 12 and 14, and 16 and 18, are pulled through a hot nip from opposite sides, and a combination of heat and pressure are applied to effect the formation of the bond between layers 14 and 16.

Now that these several exemplary processes for making the structure of FIG. 1 have been described, those skilled in the art will appreciate that the structures illustrated in FIGS. 4, 5, 6 and 7 may likewise be made by similar processes and combinations of processes.

Further to illustrate the processes which may be involved in making the more complex structures, three additional process sequences are hereinafter iterated.

Figure 5:
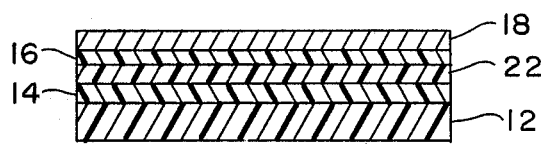

First referring to FIG. 5: Foil layer 18 is first coated with the primer, dried and cured to form coating layer 16. Layer 16 is then extrusion coated with layer 22 followed by a second extrusion coating of layer 14 onto layer 22 followed by a third extrusion coating of layer 12 onto layer 14.

Secondly, referring to FIG. 7: Foil layer 18 is first adhesively laminated to layer 20, then is coated with primer layer 16. The combination of layers 12, 14, and 22 is separately coextruded and subsequently extrusion laminated to layer 16 using layer 24 as the extrusion laminant.

Thirdly, referring to FIG. 6: Foil layer 18 is first adhesively laminated to layer 20, then is coated with primer layer 16 as above. Layer 12 is separately extruded and is subsequently coextrusion laminated to layer 16 using the combination of layers 14 and 22 as the coextrusion laminant.

It will be noted that the primer coating 16 which is used to enhance the bonding of foil layer 18 to the sealant side of the structure is variously referred to as a coating and as a layer, depending on the function being dealt with. This dual terminology recognizes the dual role of the primer in that by its thickness it is considered a coating, but by virtue of the necessity to illustrate it and to consider its chemical properties, it is convenient to also consider it as a layer. By whichever terminology is used, there is a consistent one, and only one, primer coating 16 on the foil layer 18.

Having thus described the invention, what is claimed is:

1. A laminated structure, wherein the layers are firmly adhered to each other in face to face contact, the structure comprising in order:
    (a) a first layer of linear low density polyethylene;
    (b) a second layer of a blend of 20% to 80% linear low density polyethylene and 80% to 20% propylene ethylene copolymer;
    (c) a third layer of aluminum foil; and
    (d) a primer coating on said third layer, said primer coating being juxtaposed between said second and third layers, said primer coating being an anhydride modified polypropylene composition.

2. A laminated structure as in claim 1 made by the process of extrusion laminating said first layer to said primer coating by using the material of said second layer as the extrusion laminant.

3. A laminated structure as in claim 1 made by the process of extrusion coating said first and second layers onto said primer coating.

4. A laminated structure as in claim 1 made by the process of said first and second layers being coextrusion coated onto said primer coating.

5. A laminated structure as in claim 1 wherein the composition of said second layer is 40% to 60% linear low density polyethylene and 60% to 40% propylene ethylene copolymer.

6. A laminated structure as in claim 1 and including a fourth layer between said primer coating and said second layer, said fourth layer comprising a propylene ethylene copolymer.

7. A laminated structure as in claim 6 and including an additional layer of propylene ethylene copolymer between said primer coating and said fourth layer.

8. A laminated structure as in claim 6 and including an additional layer between said primer coating and said fourth layer, said additional layer comprising a blend of 40% to 80% propylene ethylene copolymer and 20% to 60% linear low density polyethylene.

9. A laminated structure as in claim 6 made by the process of:
    (a) said first and second layers being coextruded as a separate structure; and
    (b) extrusion laminating said first and second layers to said primer coating using the composition of said fourth layer as the extrusion laminant.

10. A laminated structure as in claim 6 made by the process of coextrusion laminating said first layer to said primer coating using as the coextrusion laminant a coextrusion of the compositions of said second and fourth layers.

11. A laminated structure as in claim 6 wherein said first, second, and fourth layers are extrusion coated or coextrusion coated onto said primer coating.

12. A laminated structure as in claim 1 or 6 and including, on the surface of said aluminum foil opposite said primer coating, an abuse resistant polymeric layer.

13. A laminated structure as in claim 12 wherein said abuse resistant layer comprises polyethylene terephthalate.

14. A laminated structure as in claim 12 wherein said abuse resistant layer comprises nylon.

* * * * *